United States Patent
Nagel

(10) Patent No.: US 12,331,471 B2
(45) Date of Patent: Jun. 17, 2025

(54) ENGINE EMISSIONS ENCAPSULATION IN ASPHALT

(71) Applicant: Caterpillar Paving Products Inc., Brooklyn Park, MN (US)

(72) Inventor: Brian D. Nagel, Ramsey, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 637 days.

(21) Appl. No.: 17/688,998

(22) Filed: Mar. 8, 2022

(65) Prior Publication Data
US 2023/0287637 A1 Sep. 14, 2023

(51) Int. Cl.
| | |
|---|---|
| E01C 19/46 | (2006.01) |
| C04B 14/28 | (2006.01) |
| C04B 26/26 | (2006.01) |
| F01N 3/08 | (2006.01) |
| F01N 13/08 | (2010.01) |
| C04B 111/00 | (2006.01) |

(52) U.S. Cl.
CPC .............. *E01C 19/46* (2013.01); *C04B 14/28* (2013.01); *C04B 26/26* (2013.01); *F01N 13/08* (2013.01); *B01D 2257/504* (2013.01); *C04B 2111/0075* (2013.01); *F01N 3/0857* (2013.01); *F01N 2240/26* (2013.01); *F01N 2570/10* (2013.01); *Y02P 40/18* (2015.11)

(58) Field of Classification Search
CPC ......... E01C 19/46; C04B 14/28; C04B 26/26; C04B 2111/0075; F01N 13/08; F01N 3/0857; F01N 2240/26; F01N 2570/10; B01D 2257/504; Y02P 40/18

See application file for complete search history.

(56) References Cited

U.S. PATENT DOCUMENTS

| | | |
|---|---|---|
| 3,526,172 A | 9/1970 | Stuart |
| 8,272,205 B2 | 9/2012 | Estes et al. |
| 9,492,945 B2 | 11/2016 | Niven et al. |
| 9,682,344 B1 * | 6/2017 | Hall ........................ B01D 53/92 |
| 10,464,234 B1 * | 11/2019 | Estes ................... C04B 40/0231 |
| 10,570,064 B2 | 2/2020 | Monkman et al. |
| 10,584,633 B2 | 3/2020 | Dunn |
| 10,913,179 B2 | 2/2021 | Fadhel et al. |
| 2019/0078273 A1 * | 3/2019 | Neisen .................... E01C 23/00 |

FOREIGN PATENT DOCUMENTS

| | | |
|---|---|---|
| CN | 1482178 | 3/2004 |
| WO | 2011036262 | 3/2011 |

* cited by examiner

*Primary Examiner* — Audrey B. Walter

(57) ABSTRACT

The present disclosure includes various methods systems and apparatuses for carbon dioxide capture and utilization such as for encapsulation in asphalt. For example, a method can include combusting fuel to generate a flow of exhaust from a working machine operating to perform one or more asphalt related tasks, capturing $CO_2$ from the exhaust, storing the $CO_2$ in a storage unit onboard the working machine, forming asphalt that includes an amount of the $CO_2$ from the storage unit by selectively mixing the amount of the $CO_2$ from the storage unit with calcium, and using the asphalt that is formed that includes the amount of the $CO_2$ from the storage unit encapsulated therein at a jobsite.

19 Claims, 3 Drawing Sheets

ENGINE EMISSIONS ENCAPSULATION IN ASPHALT

TECHNICAL FIELD

The present application relates generally to asphalt paving using working machines. More particularly, the present application relates to a $CO_2$ capture and utilization system for working machines in the asphalt industry.

BACKGROUND

Working machines, such as paving machines, compactors, cold planers, graders, reclaimers, rollers, haul trucks etc., are often utilized in tandem to perform various asphalt related tasks (laying asphalt, removing asphalt, reclaiming asphalt, compacting asphalt or soil, rolling asphalt, hauling, etc.). For example, a paving machine may receive asphalt from a haul track that has carried the asphalt from an asphalt production plant to the paving machine. The paving machine is configured to lay the asphalt in a uniform manner on a surface of a work area.

Many of these vehicles utilize internal combustion engines that produce emissions. These emissions are subject to various regulatory regimes in different jurisdictions. It is desirable to reduce engine emissions including $CO_2$.

U.S. Pat. No. 10,913,179 B2, U.S. Pat. No. 9,492,945 B2 and U.S. Pat. No. 10,570,064 describe systems for capturing $CO_2$ and/or for using the $CO_2$ in forming concrete products. However, these patents focus on problems and solutions related to concrete products in the concrete industry, and therefore, differ from those of the asphalt industry.

SUMMARY

In one example, method is disclosed. The method can include any one or combination of combusting fuel to generate a flow of exhaust from a working machine operating to perform one or more asphalt related tasks, capturing $CO_2$ from the exhaust, storing the $CO_2$ in a storage unit onboard the working machine, forming asphalt that includes an amount of the $CO_2$ from the storage unit by selectively mixing the amount of the $CO_2$ from the storage unit with calcium, and using the asphalt that is formed that includes the amount of the $CO_2$ from the storage unit encapsulated therein at a jobsite.

In another example, a $CO_2$ capture and utilization system is disclosed. The system can include any one or combination of a plurality of working machines, a control system and an asphalt mixing chamber. The plurality of working machines can be configured to perform one or more asphalt related tasks at a jobsite including laying asphalt on one or more surfaces. One or more of the plurality of working machines can include an onboard storage unit configured to store $CO_2$ that results from combustion of fuel to operate the one or more of the plurality of working machines. The control system can be configured to control mixing of an amount of the $CO_2$ from the storage unit with calcium. The asphalt mixing chamber can be configured to form asphalt from the mixing of the amount of the $CO_2$ and the calcium, one or more aggregates and asphalt cement.

In another example, a paving machine is disclosed. The paving machine can include any one or combination of an internal combustion engine, one or more motive apparatuses, an engine emissions system, and a storage unit. The internal combustion engine can be configured to combust fuel to produce power and generate a flow of exhaust. The one or more motive apparatuses can be driven by the power produced by the internal combustion engine to move the paving machine along a surface of a jobsite. The engine emissions system can be configured to capture $CO_2$ from the exhaust. The storage unit can be configured to store $CO_2$.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. In some cases, the aggregate can include an amount of captured $CO_2$ that has been mixed such as in or prior to or in an asphalt mixing chamber with calcium and carbonized to form $CaCO_3$.

Figure 1:
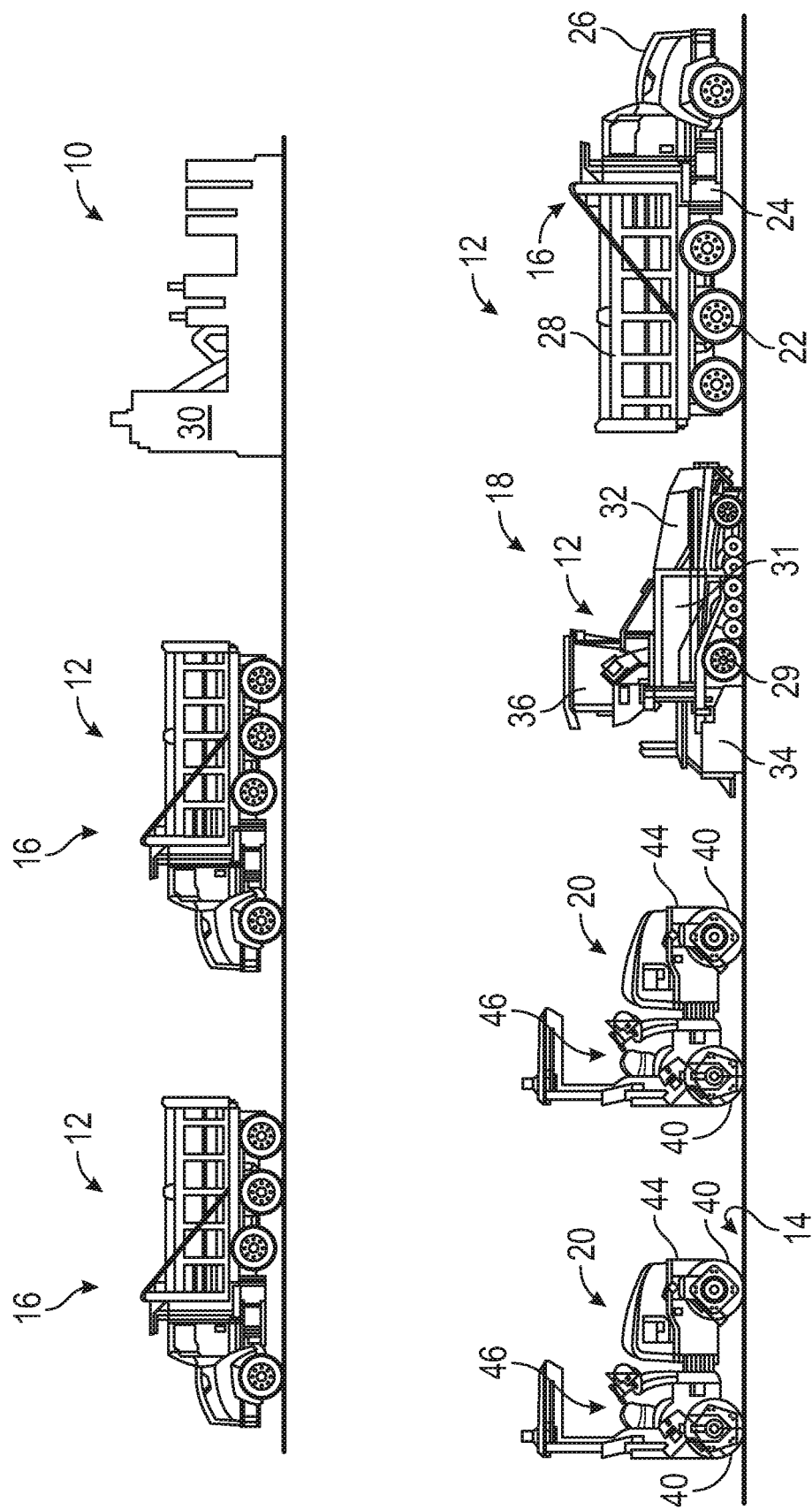
FIG. 1 is an illustration of an exemplary jobsite of an asphalt road surfacing operation having a plurality of working machines.

FIG. 1 shows an exemplary jobsite 10 where a plurality of working machines 12 are employed to perform various asphalt related tasks including a road surfacing operation. The asphalt related tasks performed by the plurality of working machines can include laying down an asphalt layer onto a work surface 14 of the jobsite 10. The surfacing operation involves completing a plurality of different asphalt related tasks according to a planned design model of a finished road, parking structure, etc.

Each of the plurality of working machines 12 may be used to perform one or more of the plurality of asphalt related tasks based on the types of operations that each respective one of the plurality of working machines 12 is configured to perform. That is, each machine is particularly configured to perform certain tasks that other machines may not be configured to perform. In this way, each machine is associated with one of the plurality of asphalt related tasks. One or more of the plurality of working machines 12 has an engine (not shown in all cases), an engine emissions system and a storage unit as further discussed herein. The engine emissions system can be configured to capture the $CO_2$ and/or other emissions from exhaust of an engine that powers the one or more of the plurality of working machines 12. According to some examples, the storage unit can be configured to hold/retain the $CO_2$ for later use as further discussed herein. Only some of the plurality of working machines 12 may include the storage unit in some embodiments. However, in other embodiments, each of the plurality of working machines 12 can have a dedicated storage unit.

The plurality of working machines 12 include one or more (i.e., at least one) haul trucks 16, paving machines 18 (only one shown), and compacting machines ("compactors") 20. It is understood that other types of working machines such as cold planers, graders, reclaimers, rollers may be used. Additional or less of the plurality of working machines 12 than are shown in FIG. 1 may be utilized.

Each haul truck 16 is a mobile machine supported on a plurality of wheels 22 connected to a frame 24. The wheels 22 are operably connected to and driven by an engine 26 via a plurality of drivetrain components (e.g., a flywheel or a torque converter, a transmission, a driveshaft, a differential, an axle, etc.). Each haul truck 16 includes a bed 28 attached to the frame 24 for carrying an amount of material, such as paving material (e.g., asphalt), from a first location, such as an asphalt production plant ("plant") 30, to a second location, such as jobsite 10. The bed 28 can include an open top side for receiving material and an enclosed rear side having a hinged tailgate for dumping material. The rear side of the bed 28 can be connected to frame 24 via a hinging mechanism, and a lifting actuator (e.g., a hydraulic cylinder) is attached to a front side of the bed 28, thereby allowing the front side of the bed 28 to be tipped upward for dumping material.

The paving machine 18 may have a motive apparatus 29 that comprises a wheels, tracks or the like. The paving machine 18 can be equipped with an engine 31 for motive and other power including to propel the motive apparatuses 29. A hopper 32 can be located at a front side of paving machine 18 for storing paving material to be deposited onto the work surface 14. Paving material from the hopper 32 can be moved via a conveyor system to a rear side of paving machine 18 where the paving material is deposited onto the work surface 14. The hopper 32 includes an open top side configured to receive additional paving material from the haul truck 16 to replace deposited paving material. The paving material is distributed across at least a portion of a width of the paving machine 18 by an auger or other distribution device.

A screed 34 can be connected to the rear end of paving machine 18. However, the screed 34 can be located in another position or can be on a separate vehicle according to some embodiments. As the paving machine 18 pulls screed 34 over the freshly deposited material this creates a mat of paving material having a desired thickness on top of the work surface 14. The screed 34 can include one or more screed plates that smooth out the fresh paving material. The screed plates are adjustable via one or more associated actuators for changing the height, width, and/or slope of the screed plates. In some embodiments, one or more of the screed plates can be connectable to an end of another screed plate by fasteners or another type of connection. Operating parameters, such as a groundspeed of paving machine 18 and the height, width, and slope of screed 34 can be controlled from an operator station 36 using a plurality of control devices (not shown).

The compactors 20 can be equipped with compacting tools 40 configured to compact the material beneath them. As shown in FIG. 1, compactor 20 can be supported on the work surface 14 by compacting tools 40 and propelled via a hydraulic system operatively connected to and driven by a power source (e.g., an engine). The compacting tool 40 is rotationally connected to a frame 44. In this way, the compactor 20 can be driven forward on compacting tools 40. It is also contemplated the compactor 20 can include wheels or other motive apparatus that is driven in addition to or in alternative to the compacting tools 40.

Operating parameters, such as a groundspeed, a travel direction, and/or other parameters, can be controlled from an operator station 46 using a plurality of control devices (not shown). In some embodiments, the compacting tool 40 is a drum having a smooth outer surface configured to engage and compact work surface 14. The drum may include an internal vibratory system comprising one or more eccentric weights driven by motors for vibrating the compacting tool 40 at a certain frequency and amplitude to cause greater compaction of the material beneath compacting tool 40. The frequency and amplitude of the vibratory system, along with other operating parameters, such as a groundspeed and travel direction of the compactor 20, can be controlled from operator station 46 using the control devices.

The asphalt production plant 30 is configured to produce asphalt for use at jobsite 10. The asphalt produced at the asphalt plant 30 may comply with certain specifications, such as aggregate size (e.g., fine grade, course grade, etc.), aggregate material type (e.g., granite, river gravel, sandstone, etc.), aggregate shape (e.g., round, angular, etc.), percent of asphalt cement, production temperature, etc. The asphalt plant 30 can produce asphalt at a certain production rate, such as an amount of asphalt (e.g., tons) per hour, and in accordance with a production plan, which may include goals and/or limitations on amounts of asphalt produced over a period of time (e.g., per day) or for use on a particular jobsite (e.g., jobsite 10). Although only one asphalt plant 30 is shown in FIG. 1, the asphalt plant 30 may be one of a plurality of plants that produce asphalt for use on jobsite 10.

Asphalt produced at the asphalt production plant 30 has an initial temperature immediately following production that is relatively high and decreases over time. Generally, the haul trucks 16 transport hot asphalt from plant 30 to the jobsite 10 so that when the asphalt is loaded into the paving machine 18, the temperature of the asphalt is still high enough to be properly deposited and compacted.

Figure 2:
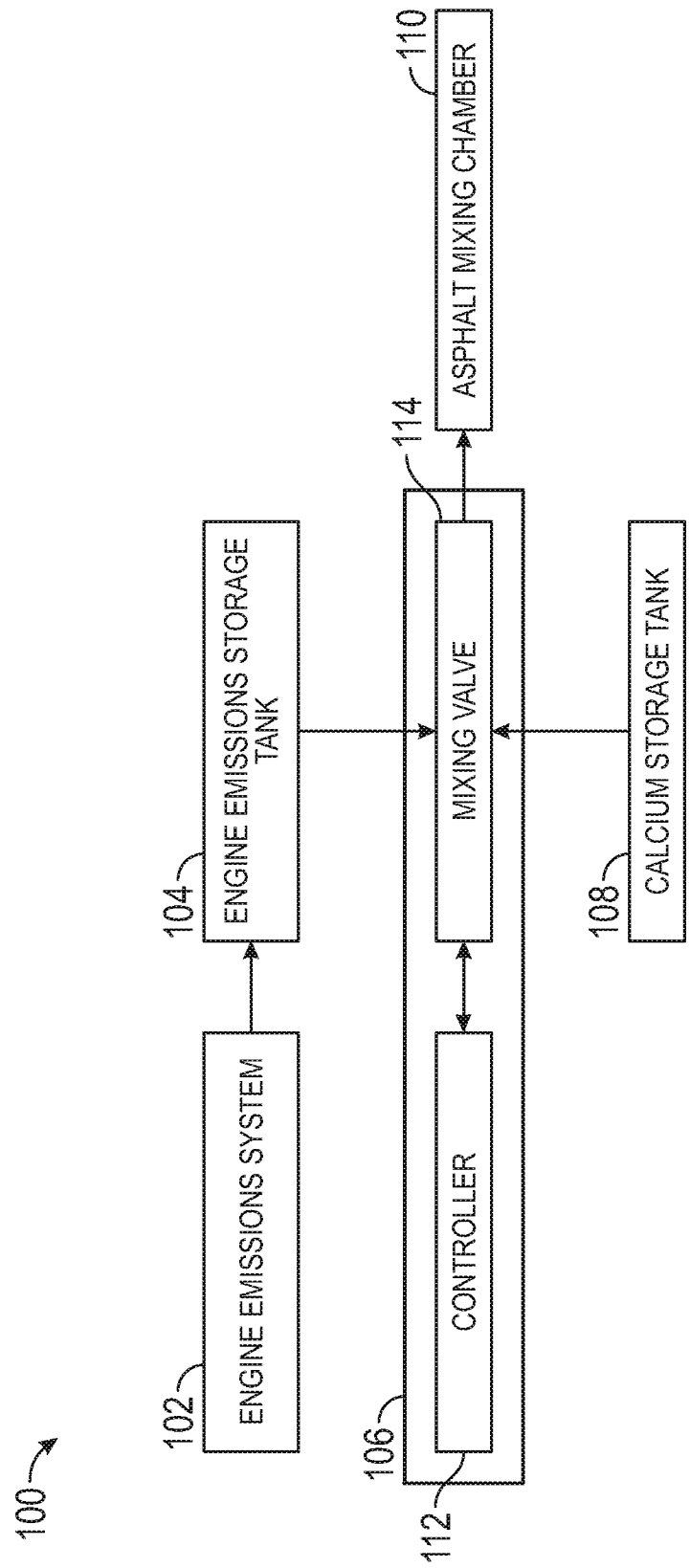
FIG. 2 is a schematic diagram illustrating a system with one or more components that can be onboard an asphalt related working machine for emissions capture and one or more components that may or may not be onboard the asphalt related working machine for $CO_2$ encapsulation in paving material.

FIG. 2 shows a system 100 configured for $CO_2$ capture and utilization as further discussed herein. The system 100 can be located entirely onboard one of the plurality of working machines 12 (FIG. 1) such as the paving machine 18, for example. However, it is also contemplated that one or more components of the system 100 can be located on one of the plurality of machines 12 (e.g., the paving machine 18, compactor 20, hauling truck 16, or other working machines not specifically shown in FIG. 1), while other components of the system 100 can be remote from the plurality of working machines such as at the jobsite 10 or asphalt plant 30 of FIG. 1.

The system 100 can include an engine emissions system 102, a storage unit 104, a control system 106, a second storage unit 108 and an asphalt mixing chamber 110. The control system 106 can include a controller 112 and a mixing valve 114.

The engine emissions system 102 can be configured as known in the art. Thus, the engine emissions system 102 can include particulate filters, scrubber(s), regeneration systems, injection systems, and/or NOx mitigation systems (e.g., oxidation catalyst systems) or the like. The engine emissions system 102 can capture various products of combustion including emissions such as an amount of $CO_2$ from exhaust produced by the engine (see various engines in FIG. 1).

Various technologies have been developed for the concentration and capture of carbon dioxide. For example, various techniques have been developed by Enhanced Energy Group, Inc. operating as "CarbonPoint Solutions", a U.S.-based carbon capture technology company operating out of Rhode Island. The techniques of Enhanced Energy Group, Inc. are described in, for example, U.S. Pat. No. 10,584,633B2, the entire disclosure of which is incorporated herein by reference. The technology includes use of molecular sieves and a heat recovery unit as discussed in U.S. Pat. No. 10,584,633B2.

The storage unit 104 can be in fluid communication with the engine emissions system 102 and can receive and store emissions including the amount of the $CO_2$ captured from the exhaust by the engine emissions system 102. The storage unit 104 can be configured to house the $CO_2$ in gas form. Thus, the storage unit 104 can be configured as a tank. The $CO_2$ can be pressurized prior to entry or can be pressurized in the tank using known mechanisms, for example. The storage unit 104 and the engine emissions system 102 can be located onboard the working vehicles discussed previously.

The storage unit 104 can fluidly communicate with the control system 106 and can communicate with the asphalt mixing chamber 110. The control system 106, using the mixing valve 114 can regulate flow of the $CO_2$ from the storage unit 104. Similarly, the control system 106 using the mixing valve 114 can regulate flow of calcium from the second storage unit 108.

The mixing valve 114 can be controlled to open, close or partially close by the controller 112, which can be electronically coupled to the mixing valve 114. The mixing valve 114 thus can be an electronically controlled valve according to some examples. The mixing valve 114 can perform mixing of the calcium with the $CO_2$. According to some examples, $CO_2$ introduced by flow through the mixing valve 114 may serve as a curing agent for the flow of calcium that is part of an uncured aggregate also flowing through the mixing valve 114. However, it is contemplated in some embodiments that the mixing valve 114 may not be utilized in all embodiments to perform mixing of the $CO_2$ with the calcium. This mixing could be performed instead at the asphalt mixing chamber 110 or in a dedicated chamber (mixing tank) or the like. Thus, according to some examples the control system 106 can include a first valve regulating flow of $CO_2$ from the storage unit 104 and a second valve regulating flow of calcium from the second storage unit 108.

Amounts and proportions of the $CO_2$ and calcium can be regulated by the controller 112 via control of the mixing valve 114. The $CO_2$ may mix with the calcium. This can occur prior to or within the asphalt mixing chamber 110. This mixing of $CO_2$ and calcium of the aggregate can cause curing forming $CaCO_3$ in the asphalt mixing chamber 110, which is a thermodynamically stable carbonate that can be part of the aggregate used to make asphalt. The carbonation reaction is expressed as $Ca(OH)_2 + CO_2 \rightarrow CaCO_3 + H_2O$. It is thought that adding the $CaCO_3$ to the paving material (e.g., the asphalt) may facilitate curing of the paving material (in addition to the benefit of encapsulating the $CO_2$ in the material).

The controller 112 can include memory (not shown), display, input and other features and components. The controller 112 can include, for example, software, hardware, and combinations of hardware and software configured to execute several functions related to control of the mixing valve 114 (and/or other features that regulate mixing of the $CO_2$ and calcium). The controller 112 can include an analog, digital, or combination analog and digital controller including a number of components. As examples, the controller 112 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The controller 112 can include or can be coupled to memory such as storage media to store and/or retrieve data or other information such as, for example, desired amounts or proportions of $CO_2$ and/or calcium for mixing. The controller 112 via memory may also store other information. Storage devices, in some examples, are described as a computer-readable storage medium. The memory can be used to store program instructions for execution by the controller 112, for example. The memory, for example, is used by software, applications, algorithms, as examples, running on and/or executed by the controller 112. The memory can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The controller 112 may be configured to determine the desired amounts or proportions of $CO_2$ and/or calcium for mixing and can vary these based upon one or more sensor input(s) such as a temperature within the asphalt mixing chamber 110, a temperature at the jobsite, an asphalt transportation time, asphalt desired characteristics (aggregate size, aggregate shape, grade, quality, etc.), asphalt desired or actual composition (based on lab tests), or any other desired criteria.

Figure 3:
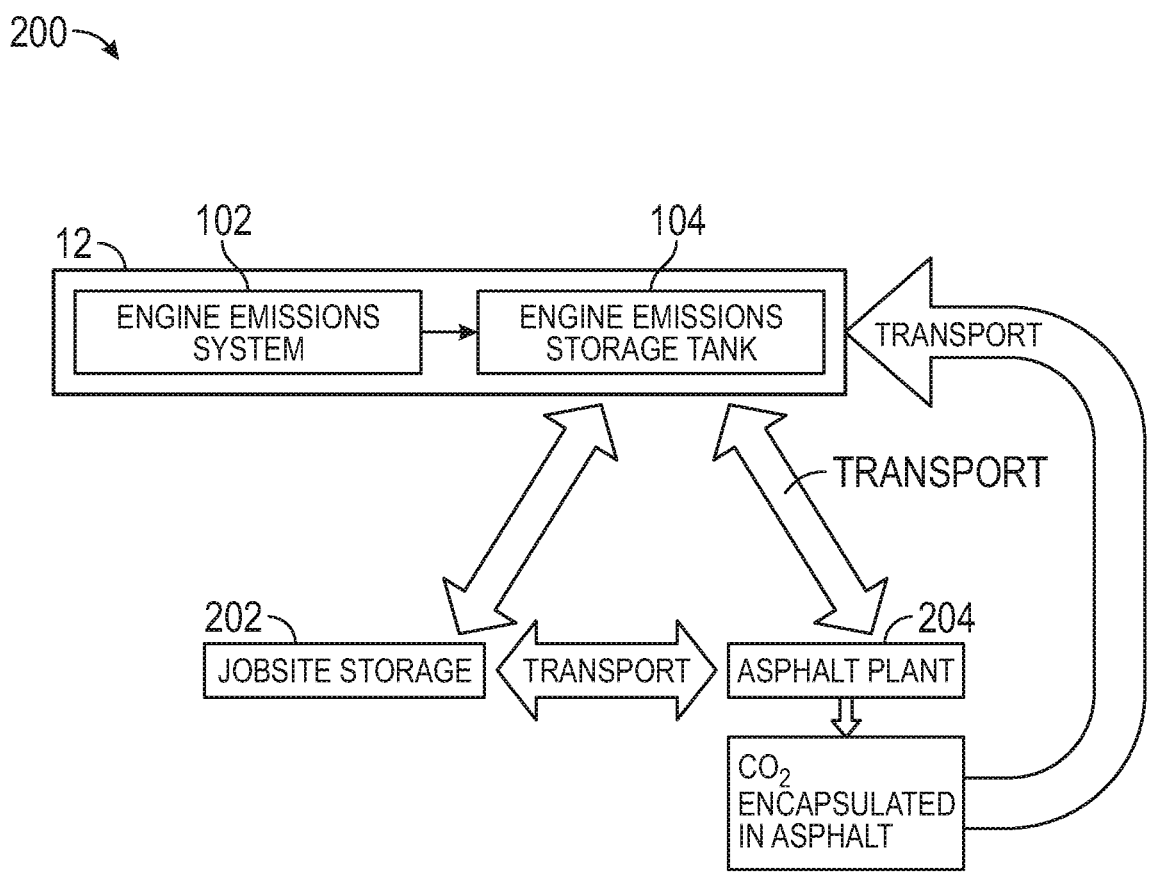
FIG. 3 is a schematic diagram illustrating $CO_2$ capture and utilization with a second system partially implemented on one or more working machines in the asphalt industry.

FIG. 3 shows a system 200 similar to that of the system 100 previously described in FIG. 2. FIG. 3 shows aspects of the system 200 including the engine emissions system 102 and the storage unit 104 as previously described implemented on one or more of the plurality of working machines 12 (e.g., the paving machine 18, compactor 20, hauling truck 16, or other working machines not specifically shown in FIG. 1). The system 200 can include other systems and components of the system 100 but these are not specifically shown.

FIG. 3 shows the system 200 can include off board systems and apparatuses that are implemented remote from the one or more of the plurality of working machines 12. In particular, the system 200 shows an arrangement where the $CO_2$ is removable from the storage unit 104 of the one or more of the plurality of working machines 12 and is transportable to one or more of a jobsite storage unit 202 and/or the asphalt production plant 204. With regard to the jobsite storage unit 202, this can comprise a larger volume tank, tank on truck, or other apparatus that can be periodically placed in selective fluid communication with the storage unit 104. The $CO_2$ of the storage unit 104 can be periodically emptied into this jobsite storage unit 202 such as via a hose, pipe or other means. The jobsite storage unit 202 can be brought to or emptied into a further container that is brought to the asphalt production plant 204 for $CO_2$ encapsulation in asphalt using the process previously discussed. Alternatively, the storage unit 104 can be removable from the one or more of the plurality of working machines 12 and can be transportable to the asphalt production plant 204. The storage unit 104 could be transported by the haul truck 16 of FIG. 1, which is empty after discharging a load of paving material and free to haul the storage unit 104 back to the asphalt production plant 204. After being emptied, the storage unit 104 can transported back to the one of the plurality of working machines 12. Transport can be via a dedicated haul truck or other truck, for example. Asphalt with encapsulated $CO_2$ therein can be transported to the jobsite (or other jobsites) via the haul trucks 16 of FIG. 1.

INDUSTRIAL APPLICABILITY

In one illustrative example, a system such as the system 100 may be used for $CO_2$ capture and utilization during asphalt related tasks (laying asphalt, removing asphalt, reclaiming asphalt, compacting asphalt or soil, rolling asphalt, hauling, etc.). A working machine's diesel engine emits $CO_2$ as well as other gasses and emissions which is not acceptable for customers and countries who are trending towards zero emissions. Although there are solutions like electrification or hydrogen to get to zero emissions, these can be costly and have performance tradeoffs. By taking the gasses emitted from the diesel engine and combining it with calcium, the $CO_2$ combines with the calcium to create the mineral calcium carbonate which can no longer be released into the atmosphere as a gas. This mineral then becomes mixed with the hot asphalt product on the paver which creates a zero carbon emission paver. The other gasses and emissions become encapsulated in the bitumen and not released into the atmosphere creating a zero emissions paver. Thus, $CO_2$ (and other emissions) can be sequestered.

It is also thought that adding $CO_2$ to the paving material can increase cure rate of the material. This can be desirable in some situations such as encapsulation at the paver during a hot day where a faster cure to allow for compaction may be desirable to improve work rate.

The apparatuses, system 100 and/or system 200 can be implemented as a method. The method can include combusting fuel to generate a flow of exhaust from a working machine 12 operating to perform one or more asphalt related tasks. The method can include capturing $CO_2$ from the exhaust. This can be performed with the engine emissions system 102, for example. The method can include storing the $CO_2$ in a storage unit 104 onboard the working machine 12. The method can include forming asphalt that includes an amount of the $CO_2$ from the storage unit by selectively mixing the amount of the $CO_2$ from the storage unit with calcium. This can be performed via the control system 106 and the asphalt mixing chamber 110, for example. As an example, the asphalt formed that includes the amount of the $CO_2$ from the storage unit encapsulated therein can be used at a jobsite.

The method optionally contemplates transporting the storage unit 104 and the asphalt back to the jobsite for use including reuse of the storage unit 104 onboard the working machine 12. The working machine 12 can be a paving machine and forming the asphalt and using the asphalt can be performed onboard the paving machine. The working machine can include a plurality of working machines performing the one or more asphalt related tasks including two or more of laying asphalt, removing asphalt, reclaiming asphalt, compacting asphalt, compacting soil and rolling asphalt. Removing the $CO_2$ from the storage unit 104 and transporting the $CO_2$ to one or more of an asphalt production plant 30 or 204, a paving machine 18, or a second storage unit (jobsite storage unit 202).

The present apparatuses, systems and methods allows reduced emissions and faster curing of asphalt, which can be desirable in some situations.

The above detailed description is intended to be illustrative, and not restrictive. The scope of the disclosure should, therefore, be determined with references to the appended claims, along with the full scope of equivalents to which such claims are entitled.

What is claimed is:

1. A method comprising:
   combusting fuel to generate a flow of exhaust from a working machine operating to perform one or more asphalt related tasks;
   capturing $CO_2$ from the exhaust;
   storing the $CO_2$ in a storage unit onboard the working machine;
   forming asphalt that includes an amount of the $CO_2$ from the storage unit by selectively mixing the amount of the $CO_2$ from the storage unit with calcium; and
   using the asphalt that is formed that includes the amount of the $CO_2$ from the storage unit encapsulated therein at a jobsite.

2. The method of claim 1, wherein the working machine is a paving machine and forming the asphalt and using the asphalt is performed onboard the paving machine.

3. The method of claim 1, wherein the working machine includes a plurality of working machines performing the one or more asphalt related tasks including two or more of laying asphalt, removing asphalt, reclaiming asphalt, compacting asphalt, compacting soil and rolling asphalt.

4. The method of claim 1, further comprising removing the $CO_2$ from the storage unit and transporting the $CO_2$ to one or more of an asphalt production plant, a paving machine, or a second storage unit at the jobsite.

5. The method of claim 1, wherein capturing $CO_2$ from the exhaust is with an engine emissions system onboard the working machine.

6. The method of claim 1, further comprising removing the storage unit from the working machine and transporting the storage unit to an asphalt production plant to perform the forming the asphalt.

7. The method of claim 6, further comprising transporting the storage unit and the asphalt back to the jobsite for use including reuse of the storage unit onboard the working machine.

8. A $CO_2$ capture and utilization system, the system comprising:
   a plurality of working machines configured to perform one or more asphalt related tasks at a jobsite including laying asphalt on one or more surfaces, wherein one or more of the plurality of working machines include an onboard storage unit configured to store $CO_2$ that results from combustion of fuel to operate the one or more of the plurality of working machines;
   a control system configured to control mixing of an amount of the $CO_2$ from the storage unit with calcium; and
   an asphalt mixing chamber configured to form asphalt from the mixing of the amount of the $CO_2$ and the calcium, one or more aggregates and asphalt cement.

9. The system of claim 8, wherein the control system and the asphalt mixing chamber are onboard a paving machine that is one of the plurality of working machines.

10. The system of claim 8, wherein the plurality of working machines performing the one or more asphalt related tasks further includes removing asphalt, reclaiming asphalt, compacting asphalt, compacting soil, hauling asphalt and rolling asphalt.

11. The system of claim 8, wherein each of the plurality of working machines has its own storage unit.

12. The system of claim 8, wherein the one or more of the plurality of working machines has an engine emissions system configured to capture the $CO_2$ from exhaust of an engine that powers the one or more of the plurality of working machines.

13. The system of claim 8, wherein the control system and the asphalt mixing chamber are at an asphalt production plant, and wherein the $CO_2$ is removable from the storage unit of the one or more of the plurality of working machines and is transportable to the asphalt production plant.

14. The system of claim 13, wherein the storage unit is removable from the one or more of the plurality of working machines and is transportable to the asphalt production plant, and wherein at least one of the plurality of working machines is configured to transport the storage unit or the formed asphalt back to the jobsite from the asphalt production plant.

15. A paving machine comprising:
- an internal combustion engine configured to combust fuel to produce power and generate a flow of exhaust;
- one or more motive apparatuses driven by the power produced by the internal combustion engine to move the paving machine along a surface of a jobsite;
- an engine emissions system configured to capture $CO_2$ from the exhaust;
- a storage unit configured to store $CO_2$;
- a control system configured to control mixing of an amount of the $CO_2$ from the storage unit with calcium; and
- an asphalt mixing chamber configured to form asphalt from the mixing of the amount of the $CO_2$ and the calcium, one or more aggregates and asphalt cement.

16. The paving machine of claim 15, further comprising a screed assembly coupled to the paving machine and configured to spread asphalt.

17. The paving machine of claim 15, wherein the control system and the asphalt mixing chamber are located onboard the paving machine.

18. The paving machine of claim 15, wherein the control system and the asphalt mixing chamber are at an asphalt production plant, and wherein the $CO_2$ is removable from the storage unit of the paving machine and is transportable to the asphalt production plant.

19. The paving machine of claim 18, wherein the storage unit is removable from the paving machine and is transportable to the asphalt production plant.

* * * * *